United States Patent [19]
Hill

[11] Patent Number: 6,037,690
[45] Date of Patent: Mar. 14, 2000

[54] ENERGY CONVERSION SYSTEM MOUNTED IN A WHEEL HUB

[76] Inventor: Wolfgang Hill, Ortenbergstr. 3, D-76135 Karlsruhe, Germany

[21] Appl. No.: 09/238,701

[22] Filed: Jan. 27, 1999

Related U.S. Application Data

[63] Continuation of application No. PCT/DE97/01670, Aug. 1, 1997.

[30] Foreign Application Priority Data

Jan. 8, 1996 [DE] Germany ............ 196 32 391

[51] Int. Cl.$^7$ .................................................. H02K 17/42
[52] U.S. Cl. ............................................ 310/168; 340/370
[58] Field of Search .......................... 310/67 R, 67 A, 310/168

[56] References Cited

U.S. PATENT DOCUMENTS

| | | | |
|---|---|---|---|
| 2,265,454 | 12/1941 | Schwab | 310/67 A |
| 3,636,392 | 1/1972 | Gerry | 310/67 R |
| 3,884,317 | 5/1975 | Kinzel | 180/220 |
| 4,377,975 | 3/1983 | Scott et al. | 105/96.1 |
| 4,539,496 | 9/1985 | Thomas et al. | 310/68 B |
| 4,539,497 | 9/1985 | Boyer | 310/75 R |
| 4,761,577 | 8/1988 | Thomas et al. | 310/67 A |
| 4,860,176 | 8/1989 | Bauwens et al. | 362/72 |
| 5,004,944 | 4/1991 | Fisher | 310/266 |
| 5,012,172 | 4/1991 | Sember | 318/696 |
| 5,079,461 | 1/1992 | Schlutter et al. | 310/67 A |
| 5,294,853 | 3/1994 | Schlutter et al. | 310/68 R |
| 5,311,092 | 5/1994 | Fisher | 310/266 |
| 5,327,034 | 7/1994 | Couture et al. | 310/67 R |
| 5,584,561 | 12/1996 | Lahos | 362/72 |
| 5,753,987 | 5/1998 | Shepherd et al. | 310/75 R |

FOREIGN PATENT DOCUMENTS

| | | |
|---|---|---|
| 3918166 | 6/1989 | Germany . |
| 4229457 | 3/1994 | Germany . |
| 4411145 | 10/1994 | Germany . |
| 95/18739 | 7/1995 | WIPO . |

*Primary Examiner*—Nestor Ramirez
*Assistant Examiner*—Joseph Waks

[57] ABSTRACT

Energy converters characterized by low manufacturing costs, high efficiency, and low weight are required to generate electric energy in vehicles. The disclosed energy converter which is arranged in or on the hub of a vehicle wheel has a generator designed as a reluctance generator. An electric energy accumulator temporarily stores the generated electric energy and, when required, uniformly transmits it to consumers. Power electronics and the electric energy accumulator are preferably also arranged in or on the wheel hub. The invention provides an efficient, light, and cost-effective energy converter system which ensures a highly reliable supply and is preferably used in light, muscle-driven vehicles.

5 Claims, 2 Drawing Sheets

ENERGY CONVERSION SYSTEM MOUNTED IN A WHEEL HUB

This is a continuation of International Application PCT/DE97/01670, with an international filing date of Aug. 7, 1997, now abandoned.

BACKGROUND OF THE INVENTION

1. Field of the Invention

The invention concerns an energy converter system mounted in a wheel hub and a process for its operation.

2. Description of the Prior Art

From DE 30 43 269 A1 a side-mounted dynamo for bicycles is known that is characterized by the integration of power electronics and an accumulator into the dynamo housing. Switching on and off of the dynamo is accomplished by manually moving the friction wheel. The mechanical on and off switch of the dynamo is required because the dynamo generates losses when idling. The transformer between the current generator and the accumulator is designed as diode circuit.

DE-PS 933 040 describes a homopolar dynamo operated as generator and designed as external rotor that is arranged without a gear in the wheel hub of bicycles and motorcycles. Homopolar machines are separately excited machines in which the exciting magnetic field is preferable generated by permanent magnets. Permanent magnet generation causes a strong cogging effect.

DE 43 17 817 C1 describes an AC-dynamo with permanent magnets in the rotor where the stator of the dynamo consists of three mutually offset induction coils with pole finger cages of soft magnetic iron. The electric machine is to run continuously as charging generator. However, the permanent magnets generate noticeable magnetic losses in the non-laminated pole fingers of the stator.

DE 44 11 145 A1 also describes a generator with identical induction coils which, however, does not have offset phases and is parallel switched in order to increase reliability of operation. The rotor with the permanent magnets is directly attached to the wheel. In order to generate sufficient power for lighting at low speeds (rpm), the generator requires considerable weight and volume. Furthermore, permanent magnetic losses in the stator iron are generated in this design also.

A smaller size is achieved by transmission gears that increase rpm. Gear dynamos in the wheel hub are known from JP 3-258 673 A or EP 0528 347 A1. Planet gears, however, are expensive and in addition increase operating resistance.

Another well-known alternative is represented by generators with air core windings in the wheel hub as described in DE 37 03 523 C2 (DC disc armatures), DE 39 18 166 C2 (EC disc armatures), or DE 42 34 388 A1. Air core windings enlarge the magnetically effective air gap and, therefore, cause high magnet expenditures.

In accordance with DE 42 32 182 A1, a brushless single phase rotor is also equipped with permanent magnets and idling losses in the core are to be reduced by a rotation of the two magnet rings in relation to each other. Idling losses are otherwise avoidable only by mechanical separation of the rotor from the wheel.

A reduction of weight can be achieved by an increase of the generator diameter in the wheel hub. Designs in this regard are known, among others, from DE-OS 27 27 827, DE 42 29 457 A1 or DE 42 29 261 C1. Here, a low degree of protection from dust and moisture and high magnet costs are disadvantages.

In DE 42 29 261 C1 the generator is designed for so much power that it can provide a noticeable contribution to driving power even in motorized operation. For motorized operation an accumulator is provided that is attached to the bicycle frame. This system is too heavy and to expensive for normal lighting purposes.

DE 43 14 290 A1 describes a switched reluctance machine and a process for control in generator operation. This is a complex, multi-phase design of a machine functioning in accordance with the reluctance principle.

From DE 195 47 159 A1 a transverse flux machine with a special air gap arrangement is known which is also executed as a switched reluctance machine. The soft magnetic body consists of numerous laminated segments which requires high assembly expenditures. In a variant of the design integrated in the wheel hub the rotor is equipped with permanent magnets.

The objective of the present invention is to advance an energy converter system integrated into the wheel hub in such a manner that a small design size and weight, high efficiency, and reliable current supply in all operation ranges is achieved at low production costs.

SUMMARY OF THE INVENTION

The objective of this invention is achieved by the characteristics presented in claim 1 or claim 5.

In accordance with the invention, the energy converter system consists of a reluctance generator that is arranged in or on the wheel hub, drive electronics, and an electric energy accumulator. The power electronics control the generator output depending on the load status of the battery, the speed (rpm), and the actual energy demand. The exciting energy supplied by the energy accumulator is adjusted such that, as long as is required by the energy demand and the load status, an optimal amount of energy corresponding to speed (rpm) is converted in the generator. At decreasing load status, a fuzzy control allows a nearly continuous transition from operation with minimum losses to operation with maximum energy yield.

The operation of the converter system aims at the operation of the energy accumulator with discharge cycles of low depth near the full load status. Suitable energy accumulators are preferably lithium accumulators or capacitors with high energy density. If the consumers consist only of light sources and if their operating time is controlled by photo sensors, this automatic operation leads to a nearly complete relief of the cyclist and to improved operational safety of the vehicle.

Preferably, the electronic components and the energy accumulator are also arranged in or at the wheel hub of the vehicle operated by muscle power. This facilitates easier assembly, lowers failure susceptibility, and decreases EMV problems.

Besides the advantages of uniform supply of the consumers with energy independent of travel speed, as well as the possibility to realize lighting without motion for a certain time after stopping or in general, the utilization of an energy accumulator provides the considerable advantage of a definitive reduction of generator mass. Compared to converter systems without energy accumulator, it is not necessary for the hub generator to output its nominal power at a minimum speed (e.g. 6 km/h), but it suffices, if it can generate the nominal power at an approximately three times higher average speed (18 km/h). This makes it possible to decrease the size and cost of the reluctance machine.

At low energy consumption and with fully loaded energy accumulator, the reluctance machine remains de-energized and almost no losses are incurred in the converter system.

In summary, compared to the state of the art, the energy converter system in accordance with the present invention is distinguished by compact, light design, inexpensive production, negligible idling losses, elimination of magnet costs, high supply reliability integrated parking light option, and simple assembly and operation.

Furthermore, if more energy is required, e.g. in winter, the energy accumulator may be loaded by an external energy source, thus reducing riding resistance.

The drawings show two advantageous embodiments of the present invention.

DETAILED DESCRIPTION OF THE PREFERRED EMBODIMENT

Figure 1:
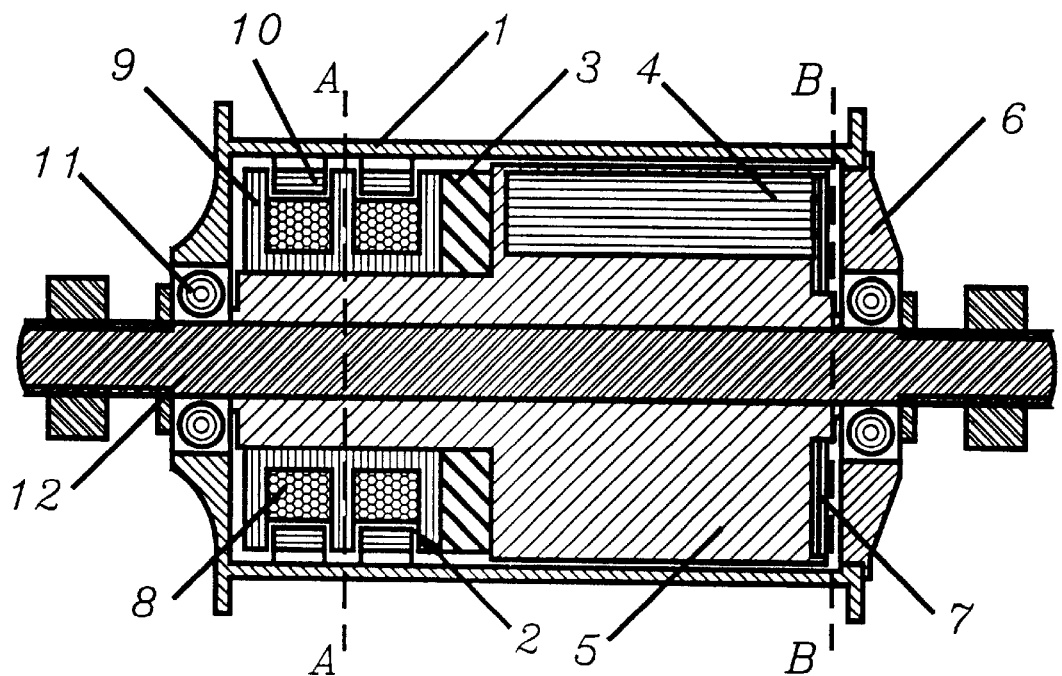
FIG. 1 shows an energy converter system in the wheel hub with accumulators.

FIG. 1 shows a two-phase reluctance generator (2) integrated in a wheel hub (1), said reluctance generator being connected via power electronics (3) to an energy accumulator (4). The energy accumulator consists of five accumulator cells that are embedded in an injection molded aluminum body (5). After opening the hub lid (6) and twisting of the contact disc (7), the accumulator cells may be replaced. The reluctance generator (2) consists of two conductor rings (8) that are surrounded on three sides by a soft magnetic body (9) consisting of three to five parts. The soft magnetic body is made as iron powder core or sinter material. The soft magnetic rotor segments (10) which are closing the magnetic circuit periodically are cast into two rings that are tangentially fixed to the wheel hub (1) but radially moveable. Start-up slide rings secure the position of the rotor rings with respect to the stator, the wheel hub in normal operation being supported by ball bearings (11) around the axle (12).

Figures 2A, 2B:
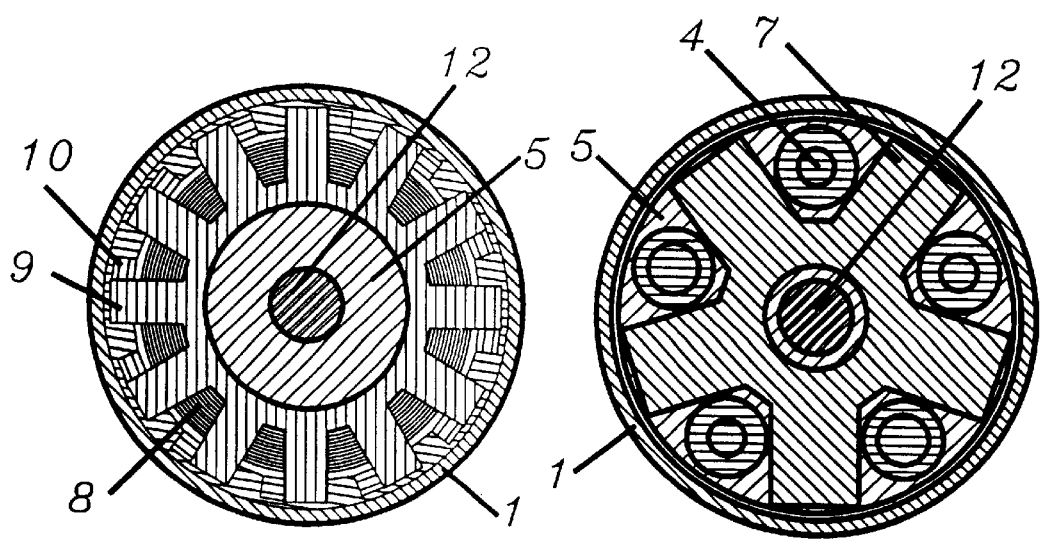
FIG. 2 shows two cross sections corresponding to lines A—A and B—B in FIG. 1.

FIG. 2a is a cut through the reluctance generator (2) and FIG. 2b shows a cut through the contact disc (7) of the energy converter system shown in FIG. 1.

Figure 3:
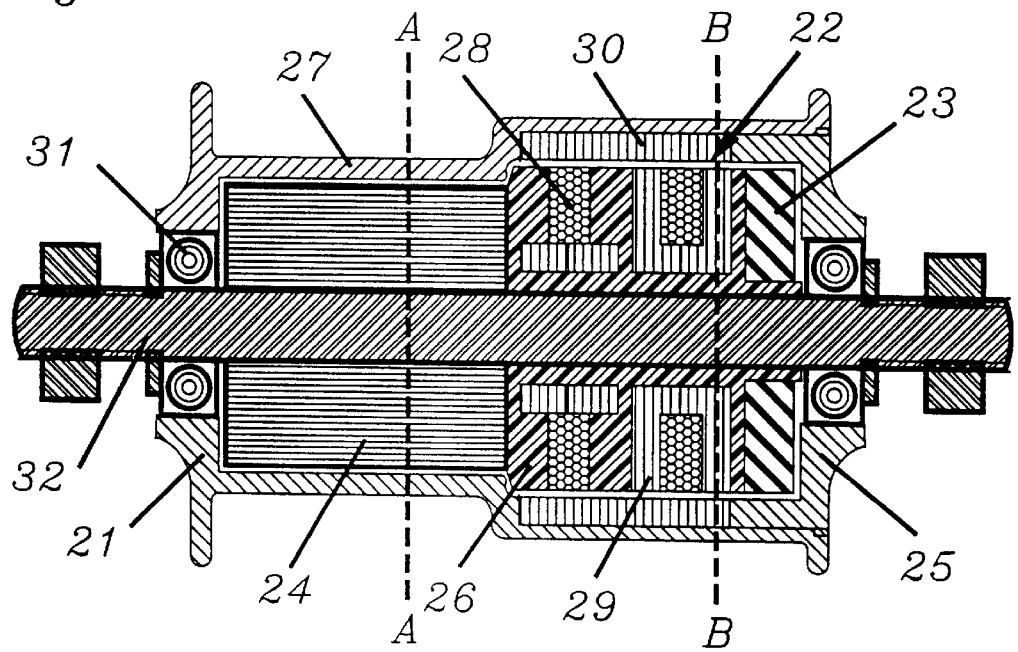
FIG. 3 shows an energy converter system in the wheel hub with a capacitor.

FIG. 3 shows a similar energy converter system where, besides the reluctance generator (22) and the power electronics (23), a cylindrical hollow capacitor is integrated as energy accumulator (24). After opening the hub lid (25), the power electronics (23) are directly accessible, while the maintenance-free capacitor is arranged in the narrow part (27) of the wheel hub in order to minimize weight. The reluctance generator (22) is embedded in a casting compound (26) and consists of two set-off identical design groups that in turn consist each of a conductor ring (28) and the soft magnetic stator body (29) enclosing the same. The rotor segments (30) extend over both phases of the reluctance generator (22) and are firmly inserted into the reinforced half of the hub. Bearings (31) and axle (32) may be purchased as conventional components.

Figure 4A:
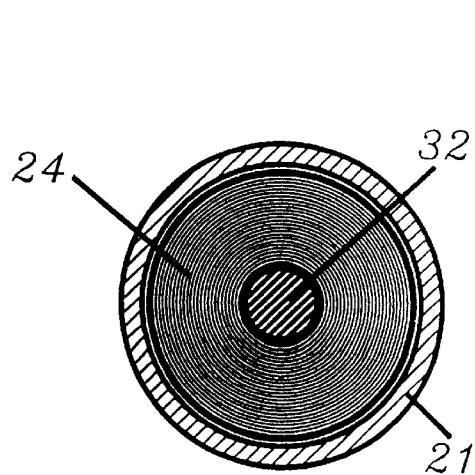
FIG. 4 shows two cross sections corresponding to lines A—A and B—B in FIG. 3.
Figure 4B:
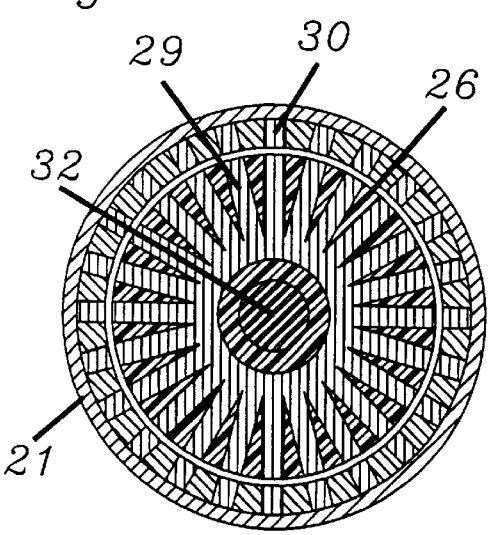

FIG. 4a is a cut through the heavy-duty capacitor (24) and FIG. 4b shows a cut through the reluctance generator (22) of the energy converter system shown in FIG. 3.

I claim:

1. An energy conversion system consisting of a switched reluctance generator, energy accumulator, and power electronics connecting said reluctance generator with said energy accumulator in order to drive said reluctance generator, wherein said reluctance generator, the energy accumulator, and the power electronics are arranged in or on a wheel hub of a vehicle.

2. The energy conversion system in accordance with claim 1, wherein the reluctance generator is equipped with conductor rings which are each enclosed on three sides by a soft magnetic stator body and which are separated by air gaps arranged radially outside said conductor rings from soft magnetic rotor segments directly connected with the wheel hub.

3. The energy conversion system in accordance with claim 1, wherein the electric energy accumulator is designed as a body that is enclosing the axle of the wheel hub.

4. The energy conversion system in accordance with claim 1, wherein the reluctance generator is embedded in a cast body of foamed light metal which possesses recesses to receive said power electronics and the energy accumulator.

5. Process of operation of an energy conversion system arranged in or on a wheel hub of a vehicle, said converter system consisting of a switched reluctance generator, an energy accumulator, and power electronics, said power electronics connecting said reluctance generator with said energy accumulator in order to control said reluctance generator and to control a load status of said energy accumulator, wherein said reluctance generator is supplied by said power electronics with exciter impulses having an exciting energy, said exciting energy of said exciter impulses being determined by said power electronics dependent on a load status of said energy accumulator, a present demand, and a number of rotations (rpm) of said reluctance generator.

* * * * *